United States Patent [19]

Villain et al.

[11] Patent Number: 4,692,180
[45] Date of Patent: Sep. 8, 1987

[54] APPARATUS AND METHOD FOR DEPOSITING A METAL OXIDE COATING ON A GLASS SUBSTRATE

[75] Inventors: Jean-Marie Villain, Monchecourt; Jacques Fremaux, Bougival, both of France

[73] Assignee: Saint-Gobain Vitrage, Courbevoie, France

[21] Appl. No.: 853,817

[22] Filed: Apr. 18, 1986

[30] Foreign Application Priority Data

Apr. 24, 1985 [FR] France .................... 85 06242

[51] Int. Cl.$^4$ .................................... C03B 18/20
[52] U.S. Cl. ........................... 65/32; 65/60.1; 65/60.5; 65/99.2; 65/157; 65/182.3; 65/182.5
[58] Field of Search ............. 65/32, 60.1, 60.5, 99.2, 65/99.3, 157, 182.3, 182.4, 182.5

[56] References Cited

U.S. PATENT DOCUMENTS

| 3,506,422 | 4/1970 | Walters ........................ 65/32 X |
| 3,660,061 | 5/1972 | Donley et al. ................ 65/32 |
| 3,850,679 | 11/1974 | Sopko et al. ............... 117/106 R |
| 3,888,649 | 6/1975 | Simhan ........................ 65/60 |
| 3,942,469 | 3/1976 | Simhan ........................ 118/48 |
| 3,951,100 | 4/1976 | Sopko et al. ............... 118/48 |
| 4,141,713 | 2/1979 | Ammannati et al. ........... 65/182 |
| 4,562,095 | 12/1985 | Coulon et al. ............... 427/180 |

FOREIGN PATENT DOCUMENTS

| 025738 | 3/1981 | European Pat. Off. |
| 2210675 | 7/1974 | France. |
| 2542636 | 9/1984 | France. |
| 8500134 | 1/1985 | France. |

Primary Examiner—Arthur Kellogg
Attorney, Agent, or Firm—Pennie & Edmonds

[57] ABSTRACT

An improved apparatus for producing a glass ribbon and an improved method for subsequently coating said glass by pyrolytically depositing a metal oxide coating thereupon. The glass is produced in a molten metal float bath having a reducing atmosphere supplied at a slightly positive pressure which is comprised of a mixture of nitrogen and hydrogen gasses. The slightly positive pressure of the reducing atmosphere within at least one lock chamber of the float bath is reduced by venting at least one lock chamber to the outside atmosphere through apertures of reduced size each of which is located in a lateral exterior wall of at least one of said chambers which is separated from the float bath by at least one other of such chambers. Additionally, blower means may be provided to direct an inert antiflame gas, such as nitrogen, toward the base of an airtight curtain at the exit of the outermost lock chamber in order to reduce or totally quench the flames attributable to the burn-off of that portion of the reducing atmosphere which escapes therefrom.

18 Claims, 3 Drawing Figures

APPARATUS AND METHOD FOR DEPOSITING A METAL OXIDE COATING ON A GLASS SUBSTRATE

FIELD OF THE INVENTION

The invention relates to an apparatus and method for depositing a coating of metal oxide produced by the pyrolysis of certain powdered compounds onto a substrate, particularly a glass ribbon produced by the float glass process.

BACKGROUND OF THE INVENTION

The float process for the production of polished flat glass, is a method well known in the art. In practice, molten glass passes out of the melting furnace following which it is passed downstream into a heated float bath where it forms a continuous glass ribbon. In this chamber, the glass ribbon floats on the surface of a molten metal (e.g. tin) bath in a controlled atmosphere at a high enough temperature and for a sufficient period of time to even out any irregularities on the surface of the glass. Because the surface of the molten tin is flat, the surface of the glass also becomes flat.

Then the glass ribbon is removed from the bath and it gets outside from the float bath chamber by passing through airtight locks located downstream from the molten metal bath until the surfaces of the ribbon are hard enough for the glass to be removed from the bath without any marking of the bottom surface by the rollers.

In conjunction with the production of a glass ribbon on float baths of the type described above, French Pat. No. 2,542,636 discloses a method whereby a nozzle arrangement is utilized to spray metallic powders, which are then thermally degraded due to the heat of the glass ribbon, in order to form pyrolyzed coatings on the moving surface of the glass.

It is also known to utilize an aspirator within the zone where the powder is sprayed onto the glass in order to eliminate excess powder which does not adhere to the glass, as well as the waste products which result from the pyrolytic decomposition of the powder upon contact with the heated glass.

French Patent Application No. 85 00 134 discloses an aspirator which is associated with a blowing mechanism. This apparatus is configured and located so as to affect the atmospheric flow in the powder distribution zone. In operation, the use of this combination creates eddies in the powder proximal to the nozzle which does not immediately become affixed to the glass ribbon. This increases the opportunities for the powder to become deposited on the glass and reduces the chance that this unbound powder will be aspirated out of the chamber at the same time as the decomposition waste products, thus increasing the efficiency of the coating operation.

An installation of this type, however, functions well only with powders having a very precise particle size. If the powder particles are coarser than originally anticipated, or if initially suitable particles become agglomerated to form clusters, the powder may possess enough energy to travel out of the deposition zone to an area near the output of the float enclosure where the reducing gas which escapes the enclosure is burned away.

In the production of polished flat glass by the float bath procedure, the tin float bath is protected from oxidation by a protective atmosphere, preferably consisting of hydrogen-enriched nitrogen. To prevent the entry of air into the bath, this protective atmosphere is introduced at a slightly positive pressure into the enclosure.

Further, a series of airtight curtains, preferably at least three, bar the output of the float enclosure above the glass ribbon as it exits from the enclosure. As a result of the positive pressure exerted by the hydrogen-enriched nitrogen, a portion of the protective atmosphere escapes from the float enclosure between the curtains and the glass ribbon and underneath the ribbon. These gasses are then ignited beyond the airtight curtain located furtherest downstream due to the high temperature under which this operation is carried out.

This then, is the location of the burning gas, near which undesirably large or agglomerated coating particles may become deposited, as discussed above. Due to the heat of the flames at the output end of the float bath, however, the coarse particles or clusters of powder are consumed in a very short time, forming an unsightly blemish upon the glass and thus rendering it unmarketable.

One object of the present invention is to prevent the formation of blemishes upon the coated surface of the glass caused by the reaction of coarse powder particles or agglomerated clusters of these metal coating compounds upon contact with the flames at the output end of the float enclosure.

A further object of the invention is to reduce the constraints upon the size of the particles which may be chosen for deposition onto a glass ribbon by thermal decomposition.

One method previously contemplated for increasing the efficiency of the coating process is to partially raise the airtight curtain located at the output of the float bath, which delineates the outer boundary of a series of cooling locks. These cooling locks comprise a plurality of chambers filled with the same non-oxidizing atmosphere used in the float bath, wherein the glass ribbon is gradually allowed to cool to a degree which allows it to be removed from the enclosure without the formation of any imprint upon its bottom surface caused by the surface of the rollers. Raising this outer curtain, however, leads to the formation of flames, caused by the combustion of the escaping gas, at the base of a curtain further upstream which may disturb or even damage the operation of the float bath itself.

Devices have also been constructed which direct non-flammable gasses from the boundary of the particle deposition zone towards said deposition zone so as to form a barrier between the flames produced by the burning gas and the particles which land in that zone and to dilute the flammable gas. This arrangement interferes, however, with the mechanism of particle distribution in that it disturbs the eddy system discussed above in relation to French Patent Application No. 85 00 134.

Applicants have therefore discovered an improved apparatus and method for preventing the formation of blemishes in a metal oxide coating deposited upon a glass ribbon which is produced in an adjacent molten metal float bath. These blemishes are caused by the interaction of the powder particles with the flames located at the outlet end of the float bath. The use of applicants' novel apparatus and method will not disturb the deposition of the coating on the glass ribbon or the production of glass in the float bath.

SUMMARY OF THE INVENTION

This invention relates to an apparatus and method for depositing a coating of metal oxide produced by the pyrolysis of powdered metal based compounds such as dibutyltin oxide, dibutyltin difluoride and indium formate onto the surface of a heated substrate, particularly a glass ribbon produced by the float glass process.

Applicants have invented an improved apparatus for producing a glass ribbon which is subsequently provided with a metal oxide coating. This coating results from the pyrolytic decomposition of one of the powdered metal compounds noted above or a combination of such compounds. Prior to the coating step, the glass ribbon, in a procedure well known in the art, first passes through a molten metal float bath enclosure which contains a reducing atmosphere of nitrogen and hydrogen at a slightly positive atmospheric pressure.

Upon leaving the float bath, the glass ribbon passes through a plurality of lock chambers, which act to prevent the escape of reducing atmosphere, the entry of the exterior atmosphere and the oxidation of the molten metal float bath. These lock chambers are constructed in series and are separated from one another and from the remainder of the apparatus by airtight curtains located crosswise in relation to the direction of advance of the glass ribbon.

The improvement to the apparatus comprises means for reducing the pressure within at least one of said lock chambers which is separated from said float bath by at least one other of such lock chambers. The means for reducing pressure comprises at least two apertures of reduced size located through at least two outer boundary walls preferably the lateral boundary walls, of the lock chamber.

In addition, the apertures for reducing pressure may be connected to exhaust means such as smokestacks in order to remove unwanted combustion gasses which exist therein.

The improvement further comprises blower means installed downstream from and proximal to the airtight curtain located fatherest downstream from the float bath in the direction of advance of the glass ribbon. This blower is used for directing an inert antiflame gas, such as nitrogen, against the base of the curtain at an angle of approximately 45 degrees in relation to the vertical. By downstream, applicants mean the direction of advance of the glass ribbon. A reference to upstream, on the contrary, refers to the opposite direction.

Applicants also claim a method for use of the improved apparatus. As a consequence of utilizing the present invention, the size of the flame at the outlet of the float enclosure is greatly reduced. Further, the flames themselves may be extinguished and relocated further upstream. This diminishes the possibility that coarse or agglomerated particles of the metal based coating which are sprayed onto the surface of the glass by nozzle means may be destroyed upon contact with the flames, thus creating blemishes upon the surface of the glass which renders it unmarketable. Use of applicants method, therefore, greatly improves the effectiveness of the coating process.

BRIEF DESCRIPTION OF THE DRAWINGS

Further benefits and advantages of the invention will become apparent from a consideration of the following description given with reference to the accompanying drawing figures which specify and show preferred embodiments of the present invention, and wherein.

DETAILED DESCRIPTION OF THE PREFERRED EMBODIMENTS

Figure 1:
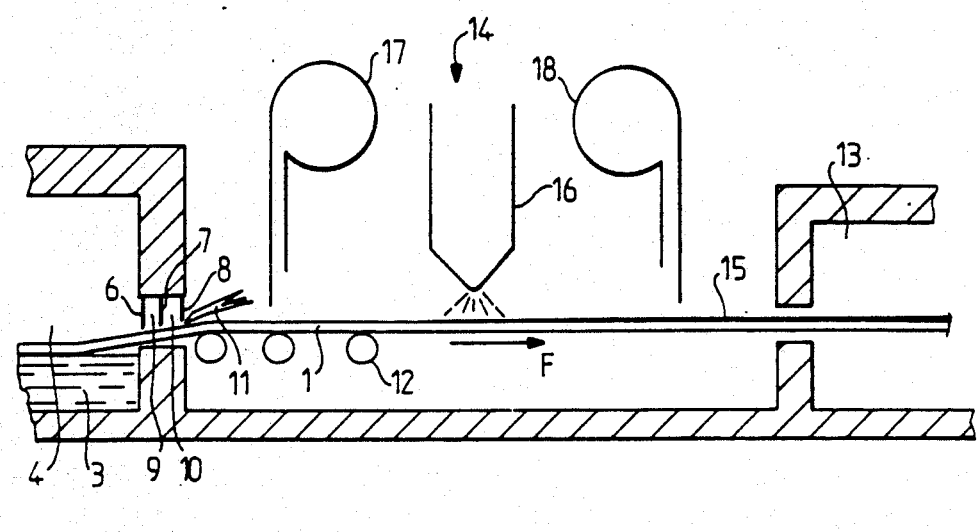
FIG. 1 is a partially cross-sectional side view of an apparatus used for depositing a coating upon a glass ribbon produced in a float bath as found in the prior art.

Referring initially to FIG. 1, there is illustrated a side view of an apparatus utilized in the prior art to deposit a metal oxide coating upon the surface of a glass ribbon as it exits the lock chambers of a molten metal float bath. This view, partially in cross section, shows glass ribbon 1 exiting float bath enclosure 2 which contains molten metal bath 3. The metal preferably chosen for float baths of this type is tin. The atmosphere in volume 4, which fills the space above molten metal bath 3 and the layer of glass 5 which spreads across it surface, consists of a reducing mixture comprising nitrogen and hydrogen gasses.

To prevent entry of the exterior atmosphere into enclosure 2 that could oxidize molten metal bath 3, a slight excess pressure of the reducing atmosphere is maintained in volume 4. By a slight excess pressure applicants mean that the reducing atmosphere is supplied within the bath enclosure at a pressure slightly above normal atmosphere pressure. Furthermore, a series of airtight curtains, preferably at least three, 6, 7, 8, delineate the boundaries of at least two lock chambers 9, 10 and also serve as a partial bar in the exit end of enclosure 2 above glass ribbon 1 between the reducing mixture of gasses within the float bath and the atmosphere outside of enclosure 2.

At the base of curtain 8, which is the farthest downstream in the direction of advance of glass ribbon 1 (marked by arrow F), the hydrogen which escapes from volume 4 under curtains 6, 7, 8 mixes with the atmosphere outside of enclosure 2 and burns in flame 11.

With regard to the coating procedure, glass ribbon 1, upon exiting enclosure 2, is conveyed on rollers 12 to, for example, annealing furnace 13. Between the exit end of enclosure 2 and annealing furnace 13 is a zone 14 in which the glass ribbon 1 is coated with a layer 15 of metal oxide.

This metal oxide layer 15 is preferably obtained by the pyrolytic decomposition of powdered metal compounds such as dibutyltin oxide (DBTO), dibutyltin difluoride (DBTF), indium formate, etc. or of mixtures of these compounds. These compounds are sprayed through nozzle 16 of the type described in European Pat. No. 125,153. Any excess powder which does not adhere to the glass ribbon 1 is then removed by aspirators 17, 18 located at least upstream of nozzle 16.

Figure 2:
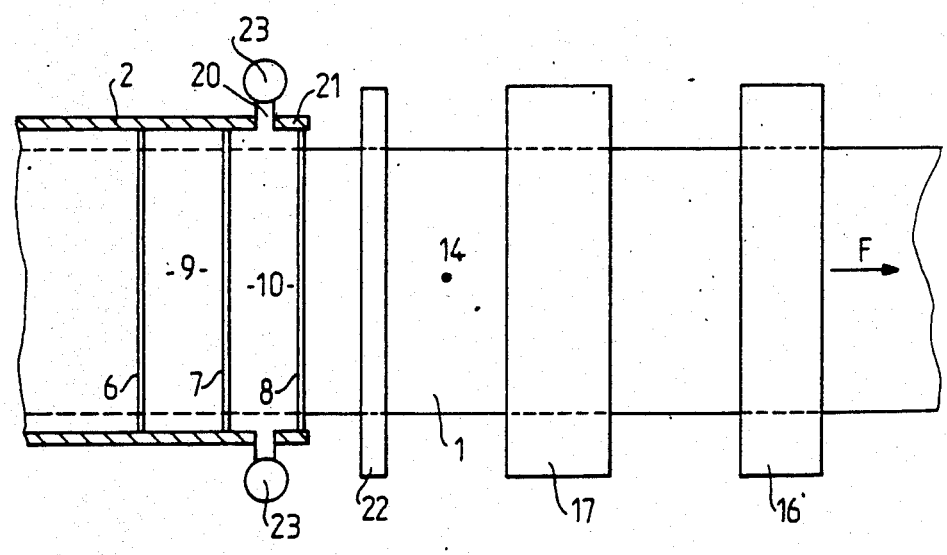
FIG. 2 is a partially cross-sectional plan view of the apparatus of FIG. 1 which has been modified according to the invention.
Figure 3:
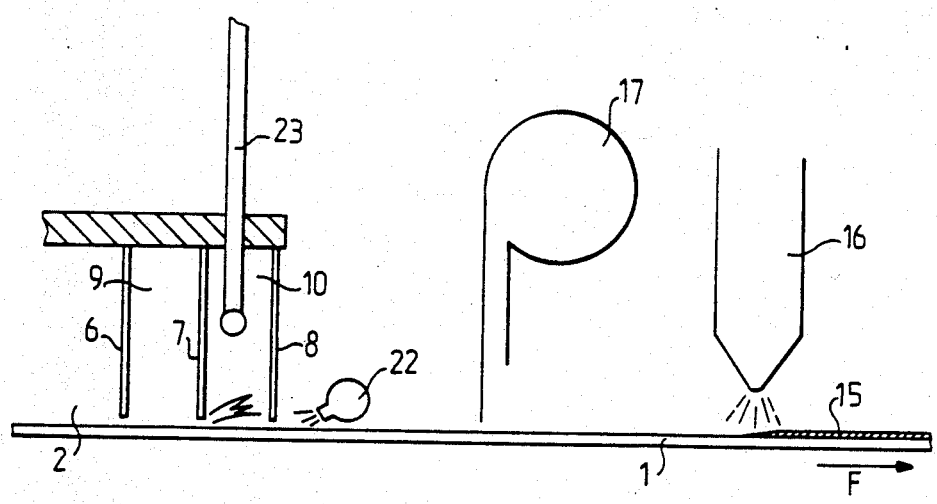
FIG. 3 is a partially cross-sectional side view of the apparatus of FIG. 2.

FIGS. 2 and 3 illustrate the improved apparatus of the invention. Features of the invention which are the same as those found in the prior art are numbered in the same manner as in FIG. 1.

The apparatus constructed according to the invention is equipped with a plurality of apertures 20 in the side walls 21 of lock chamber 10 in order to vent chamber 10. These venting apertures are preferably located in the lock chamber which is located farthest downstream in the direction of movement of glass ribbon 1. This allows a certain amount of communication between the atmosphere within lock chamber 10 and the outside air, thus reducing the slight excess pressure which prevails therein.

These apertures must be kept small enough to allow a reduction of the pressure within chamber 10 without disturbing the functioning of the float bath and they should by symmetrically located on both lateral boundary walls 20 of chamber 10. The surface area of each aperture should preferably not exceed 100 cm$^2$.

The effect of these apertures 20 is to reduce the pressure of the reducing gas which may escape under airtight curtain 8 and, consequently, to reduce the size of flame 11. As a result of the decrease in flame size, many fewer particles of the metal coating compounds are burned and the quality of coating 15 is greatly improved.

Applicants' invention further includes means to relocate flame 11 and cause it to ignite at the base of airtight curtain 7, located further upstream inside lock chamber 10. These means include blower means 22 for directing an inert antiflame gas, preferably nitrogen, located close to the base of curtain 8. The gas flow preferably ranges between about 100 to 300 N m$^3$/hour for the entire width of the float bath (e.g. about 3.5 meters). This minimal flow of gas also minimizes the temperature disturbance which glass ribbon 1 is subjected to and thus does not interfere with the coating operation.

Blower means 22 is preferably located in coating zone 14 and the blowing orifices, which may be a single or multiple slot or spaced holes, are oriented to direct the flow of gas toward the base of curtain 8. Preferably the blower means is oriented at an angle of approximately 45° in relation to the vertical.

As a result of the introduction of the inert antiflame gas, flame 11, already weakened by the decrease in pressure within lock chamber 10 due to apertures 20, is re-situated in the interior of the chamber at the base of airtight curtain 7, which, as noted above, is further upstream along the path which the glass ribbon travels.

In order to evacuate the combustion gasses now produced within lock chamber 10, the apertures 20 in the lateral boundary walls 21 of chamber 10 are preferably connected to smokestacks 23.

In the apparatus invented by applicants, the particles of metal powder which are sprayed from nozzle 16 are no longer burned at the outlet of the float bath 2 because the distance to the new location of flame 11 is too great for them to travel, and further, they are intercepted by curtain 8 and prevented from reaching flame 11 in the first instance.

A preferred application of the present invention is in conjunction with the coating apparatus described in French Patent Application No. 85 00 134, discussed above, in which eddies are created to recirculate the powder particles which do not immediately decompose on the heated glass ribbon 1. These eddies normally have a tendency to aspirate flame 11 into the coating zone. When the apparatus is modified as disclosed by the invention and the flame is relocated inside lock chamber 10 at the base of curtain 7, flame 11 is insensitive to this aspiration effect which is created by the eddies. The invention may also be used with other types of coating installations as well which are known to those skilled in the art.

Alternately, in applications utilizing more than two lock chambers, it is also possible to modify the next-to-last lock chamber as described above, or even a chamber located further upstream, provided that there is at least one remaining cooling chamber separating the modified chamber from the interior of the float bath 2. Any decrease in pressure occurring in a chamber constructed according to the invention is passed on to all of the chambers positioned downstream, i.e. in the direction of travel of the glass ribbon 1.

It is also possible to utilize blower means 22 alone to produce the desired effect. It is preferable, however, to combine the effect of blower means 22 with that produced by constructing lock chamber 10 according to the invention in order to provide the maximum stability for flame 11 at the base of curtain 8.

While it is apparent that the invention herein disclosed is well calculated to fulfill the objectives above stated, it will be appreciated that numerous modifications and embodiments may be devised by those skilled in the art, and it is intended that the appended claims cover all such modifications and embodiments as fall within the true spirit and scope of the present invention.

We claim:

1. In an apparatus for producing a glass ribbon wherein molten glass is directed across a top surface of molten metal float bath means having an enclosure containing a reducing atmosphere comprising a mixture of nitrogen and hydrogen gas supplied at a slightly positive pressure, said enclosure including at least one lock chamber for preventing the escape of the reducing atmosphere, the improvement comprising means for reducing the pressure within said at least one lock chamber wherein said lock chamber includes at least one airtight curtain means for separating said lock chamber from said molten metal float bath means, said curtain means being located crosswise in relation to the direction of advance of said glass ribbon, and said apparatus further comprising blower means located downstream from and proximal to the airtight curtain means located furtherest downstream from the float bath means in the direction of advance of the glass ribbon for directing an antiflame gas in the direction of a base portion of said curtain means.

2. The apparatus of claim 1 wherein said enclosure includes more than one lock chamber.

3. The apparatus of claim 2 wherein said pressure reducing means is vent means which comprises at least two apertures, each of which is located in an outer boundary wall of said lock chamber.

4. The apparatus of claim 3 wherein said outer boundary walls are lateral boundary walls.

5. The apparatus of claim 3 wherein said apertures are located in the walls of the lock chamber which is positioned furthest downstream from said molten metal float bath means in the direction of advance of the glass ribbon.

6. The apparatus of claim 5 which further comprises exhaust means connected to each of said apertures.

7. The apparatus of claim 6 wherein said exhaust means is a smokestack.

8. The apparatus of claim 1 further comprising means for depositing a metal oxide coating upon a surface of said glass ribbon, said deposition means being located adjacent to and downstream of said lock chamber.

9. The apparatus of claim 8 wherein said means for depositing a metal oxide coating is nozzle means for spraying a powdered metal compound onto a heated surface of the glass ribbon.

10. The apparatus of claim 1 wherein the antiflame gas is nitrogen.

11. The apparatus of claim 1 wherein the blower means is oriented in the direction of the airtight curtain means at an angle of approximately 45 degrees in relation to the vertical.

12. In an apparatus for producing a glass ribbon wherein molten glass is directed across a top surface of molten metal float bath means having an enclosure containing a reducing atmosphere comprising a mixture of nitrogen and hydrogen gas supplied at a slightly positive pressure, said enclosure containing a plurality of lock chambers for preventing the escape of the reducing atmosphere, said lock chambers being constructed in series and being separated one from another by airtight curtains located crosswise in relation to the direction of advance of the glass ribbon, the improvement comprising:

pressure reducing means located within at least one of said lock chamber which is separated from said molten metal float bath means by at least one other of such lock chamber, wherein said pressure reducing means comprises at least two apertures each of which is located in a lateral boundary wall of said lock chamber and wherein each of said apertures are connected to exhaust means such as a smokestack; and blower means located downstream from and proximal to the airtight curtain means located furthest downstream from the float bath means in the direction of advance of the glass ribbon for directing an antiflame gas such as nitrogen against the base of said curtain at an angle of approximately 45 degrees in relation to the vertical.

13. In a method for depositing a coating of metal oxide powder onto a glass ribbon as said glass ribbon exits from a lock chamber of molten metal float bath means which contains a reducing atmosphere of a mixture of hydrogen and nitrogen gasses therein, and wherein a flame extending from said lock chamber of said molten metal float bath means in the direction of travel of the glass ribbon is generated due to the combustion of a portion of said hydrogen gas, the improvement which comprises:

reducing the intensity and size of said flame by venting said lock chamber so that the flame does not impinge upon the powder as it is being deposited, and directing a flow of an antiflame gas towards said flame at an angle of approximately 45 degrees in relation to the vertical; thus improving the quality of said coating by reducing the amount of blemishes formed on a coated surface of said glass ribbon.

14. The method of claim 13 wherein said lock chamber is vented by directing said reducing atmosphere within said chamber outwardly through at least two apertures each located on a lateral outer boundary wall of said chamber.

15. The method of claim 14 which further comprises providing a plurality of said lock chambers and wherein said apertures for venting said chamber are provided only in said chamber positioned furthest downstream from said molten metal float bath means in the direction of advance of the glass ribbon.

16. The method of claim 14 which further comprises connecting means to exhaust gas which is removed through said apertures.

17. The method of claim 13 wherein the flow of the antiflame gas is directed through blower means.

18. In a method for depositing a coating of metal oxide powder onto a glass ribbon as said glass ribbon exits from a lock chamber of molten metal float bath means containing a reducing atmosphere of a mixture of hydrogen and nitrogen gasses therein and wherein a flame extending from said lock chamber of said molten metal float bath means in the direction of travel of said glass ribbon is generated due to the combustion of a portion of said hydrogen gas, the improvement which comprises:

reducing the intensity and size of said flame by directing said reducing atmosphere within said lock chamber outwardly through at least two apertures, each of which is located in a lateral outer boundary wall of said chamber so as to vent said means;

connecting means to exhaust gas removed through said apertures to each of said apertures; and directing a flow of an antiflame gas toward said flame at an angle of approximately 45 degrees in relation to the vertical, thus improving the quality of said coating by reducing the amount of blemishes formed on a coated surface of the glass ribbon.

* * * * *